Figure 1:
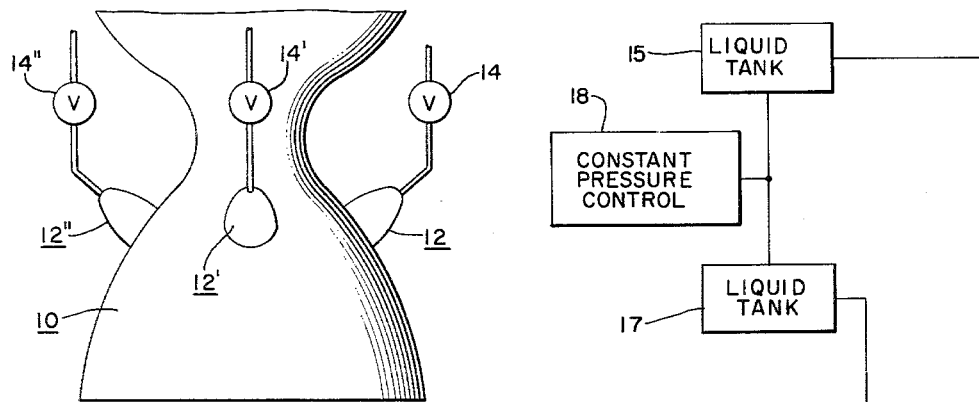

EDWARD V. JARAMILLO
ARVEY J. SHIER
INVENTORS.

BY David P. Ogden

ATTORNEY

United States Patent Office 3,232,537
Patented Feb. 1, 1966

1

3,232,537
THRUST VECTOR CONTROL ARRANGEMENT
Edward V. Jaramillo, Woodland Hills, and Arvey J. Shier, Van Nuys, Calif., assignors to The Aerospace Corporation, Los Angeles, Calif., a corporation of California
Filed Jan. 19, 1962, Ser. No. 167,328
3 Claims. (Cl. 239—75)

This invention relates to a thrust vector control arrangement useful in directing and correcting the attitude and flight path of rocket vehicles during powered flight.

Space vehicle technology recognizes a severe problem in the maintaining of directionally-controlled thrust during lift-off and powered flights of the vehicle. For instance, it is well known that extremely minor technical malfunctions will deflect the thrust vector sufficiently to tend to cause the vehicle to deviate from its projected flight path. Any deviation or tendency to deviate must be corrected instantaneously and failure to correct such deviations has necessitated destruction of many multimillion dollar equipments. Although various thrust control arrangements have been used and are being tested, many such arrangements require complex equipments which are themselves subject to malfunction or result in substantial loss of thrust which loss tends to reduce payload capabilities.

It is now recognized that effective thrust vector control can be achieved by injecting a secondary fluid into the exhaust gas within the nozzle. This method is commonly referred to as secondary fluid injection thrust vector control. Essentially, the resulting interaction between the two flows deflects the primary exhaust gas flow creating substantial lateral forces which may greatly exceed any reaction of the secondary jet alone. This greater lateral force is, in part, developed by the occurrence of a shock wave which exerts lateral forces on the propulsion nozzle without greatly influencing the primary thrust. In fact, the primary axial thrust may be augmented by this method. Either liquid or gaseous jets may be used, each having advantages. The use of a gas injection system is recognized as generating greater lateral thrust per pound of secondary fluid. However, because of the technological difficulties in operating gas metering valves, particularly in extreme thermal environments, the valve itself and the control equipment for the valve are more complex than those of a liquid injection system. Such complexity is a severe problem both because of the possibility of malfunction and because it makes impossible weight optimization of the over-all system.

Thus, it appears that a gas injection system might be most suited for a flight having a substantial thrust vector control requirement while a liquid injection system is likely to be more efficient when the thrust vector control problems can be minimized. However, in this technology it is not easy to accurately predict the total necessary weight of a thrust vector injection fluid, whereupon it is extremely desirable to have a versatile system taking advantage of the best features of both gas and liquid thrust vector control systems to accomplish weight optimization both in the control system and in the fluid supply system.

Therefore, an object of the present invention is to provide an efficient and reliable thrust vector control arrangement.

Taking into account the fact that a liquid is more easily controlled and a gas is more effective as a secondary injection medium, in accordance with one embodiment of the present invention, a thrust vector control liquid is supplied to a liquid control valve which selectively meters the liquid into a heated gasifying chamber from where the resulting secondary gas jet flows into the engine exhaust to correct the thrust vector of the vehicle. By utilizing a liquid valve arrangement as distinguished from

2 a gas valve arrangement while at the same time taking advantage of the greater efficiency of the secondary gas jet, the over-all system becomes simplified, subject to improved weight considerations, and more reliable.

Figure 2:
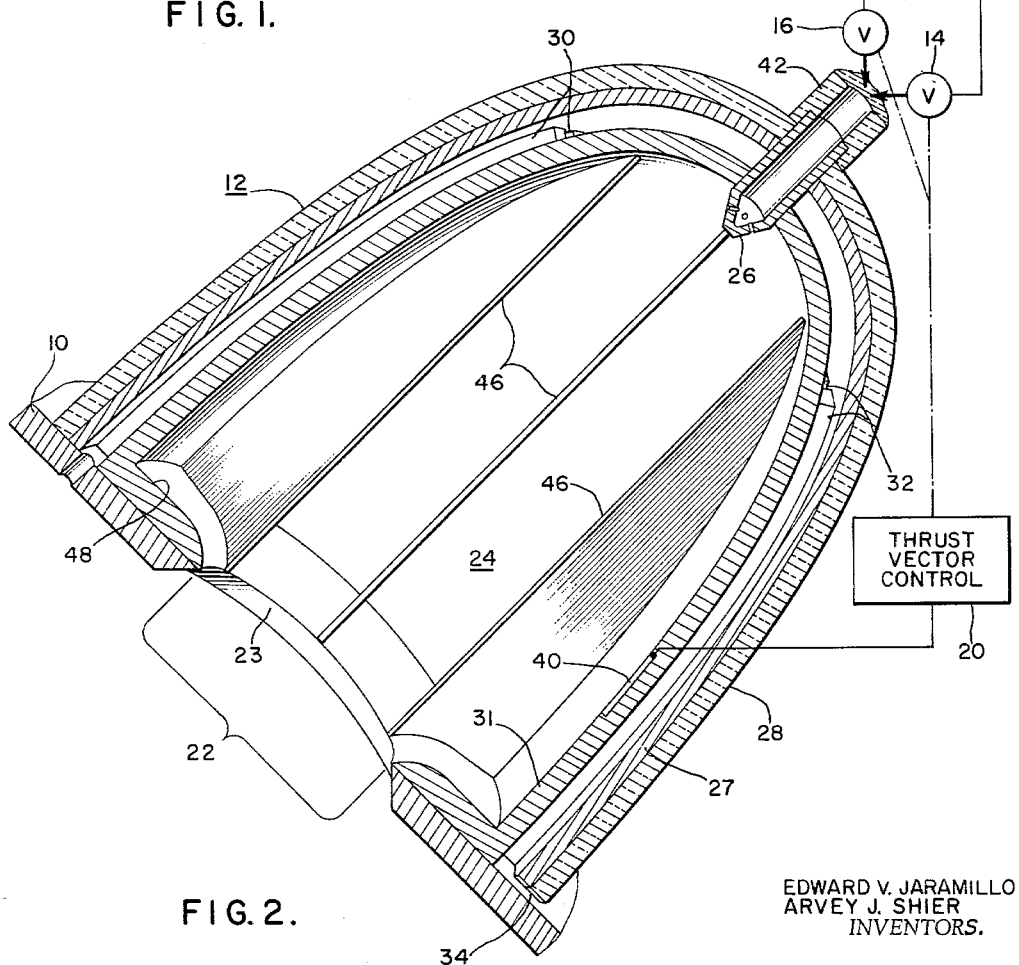

The subject matter which is regarded as our invention is particularly pointed out and distinctly claimed in the concluding portion of the specification. The invention, however, as to its organization and method of operation, together with the further objects and advantages thereof, will best be understood by reference to the following description taken in connection with the accompanying drawing in which:

FIG. 1 is a schematic view of a large rocket engine propulsion nozzle showing the location of the present invention; and FIG. 2 is a detail perspective view in cross-section of the present invention.

Referring now to the drawing, wherein like numerals refer to similar parts, in FIG. 1, a propulsion nozzle 10 of a rocket engine is provided with a plurality of thrust vector control injectors 12, 12′ and 12″ annularly positioned around the propulsion nozzle 10. As shown, the injectors are annularly spaced at 90° intervals whereby selective operation will provide easily computable thrust vector control. Metering valves 14, 14′ and 14″ control the flow selectively of secondary fluid to the injectors 12, 12′ and 12″.

Referring now to FIG. 2, the one injector 12 is shown in detail. The positioning of the injector longitudinally of the propulsion nozzle 10 is selected so that the exhaust gas pressure is of the order of 5–50 p.s.i. Thus the pressure of the thrust vector control liquid in a thrust vector control liquid storage tank 15 and metered by the valve 14 may be of the order of 15–250 p.s.i. As explained in more detail below, a second metering valve 16 and a second thrust vector control liquid storage tank 17 will be used in certain operational programs. A constant pressure control arrangement 18 is coupled to tanks 15 and 17 to maintain a desired constant pressure in the tanks 15 and 17. Using pressures of such a magnitude, the constant pressure system may be designed by known techniques to obtain optimum weight. A completely uniform pressure will allow the function controlled by a thrust vector control means 20 to be simply the aperture variation of the valve 14. Usually this arrangement generates an electrical power signal for operating the valve 14. The signal maintains the valve fully open for a predetermined time as a function of the thrust vector deflection required. On the other hand, if the pressure of the thrust vector control liquid were allowed to vary, the additional variables which would, of necessity, be considered by the thrust vector control means 20, would seriously complicate the over-all system. Since proper control of rockets engines requires as great as possible simplification, such an approach to the problem is not warranted. The details of thrust vector control means are known and need not be set forth herein.

In most applications of the present invention when used in rocket engines having thrust of the order of 500,000 lbs., the injector aperture as indicated at 22 will be of the order of 2–4″ diameter. With such an aperture it is a relatively simple matter to have the thrust vector control gas emitted therethrough at sonic velocity whereupon the thrust vector control of an injector per unit time is calculable. Also with a divergent orifice 23 we obtain choked super sonic flow into the propulsion nozzle 10. Assuming a pressure of the order of 25 p.s.i. downstream of the orifice 23, a pressure necessary to obtain supersonic flow would be of the order of 60–75 p.s.i. in a gasifying chamber 24 of the injector 12. In order that the thrust vector control liquid will be assured of vaporization in the chamber 24, it is injected through a liquid spray nozzle 26 to be applied against a large portion of the inner surface of the chamber 24.

Under normal operating conditions, it is expected that no one of the injectors 12 would be utilized more than a very small percentage of time of powered flight of the vehicle. Therefore, the chamber 24 will be heated well above vaporization temperatures of the thrust vector control liquid during flight whereupon each injection of the thrust vector control liquid will result in complete vaporization and will generate sufficient pressure to produce sonic flow of the thrust vector control gas through the aperture 22. However, in order to provide a system which will correct for substantial malfunctions of a rocket engine it may be preferable to provide additional means of maintaining the heat of the chamber 24.

For instance, as shown in FIG. 2, the outer surface or dome 27 of the injector 12 is protected from ambient temperatures by a thermal insulation layer 28. Moreover, there is provided additional heat exchanger means in the form of a plurality of passageways 30 which supply at least some hot gases from the primary exhaust gas of the propulsion nozzle 10 around the chamber walls 31 of the chamber 24. Similar exhaust passageways 32 are provided so that the heat exchanger gases may flow completely around the walls 31. Since there is inherently a small pressure differential as the exhaust gas flows across the region of the injector 12 at least some hot gas would flow through the passageways 30 and 32 to heat the chamber 24, even if both passageways were coupled directly into the main exhaust gas stream. When a shock wave is created by the secondary injection, this pressure differential is sharply increased by the occurrence of a low pressure through downstream of the orifice 23. However, this natural flow may easily be supplemented by providing bleeder vents 34 coupling the ends of the passageways 32 to the outside of the propulsion nozzle 10. Obviously more complex scoop or venturi arrangements may be utilized, but in general they will tend to deflect or otherwise cause turbulence in the rocket engine propulsion thrust flow where turbulence is undesirable.

The above heating problems may be of considerable magnitude when certain fluids such as nitrogen tetroxide, Freon, or liquid hydrogen are used exclusively in the injector 12. This would be especially true if the vehicle were designed to make powered intercept or powered evasive maneuvers. Therefore, in some of the more sophisticated thrust vector control arrangements, it is preferable to have available a second type vector control fluid which, by itself or when mixed with the first vector control fluid, will be effective to maintain the minimum critical temperature in the injectors 12, 12' and 12". Thus, we have provided the second liquid metering valve 16 and liquid tank 17 to be used to supply a reactive pyrogolic or hypergolic charge or a catalytic monopropellant charge to the chamber 24 when it reaches a minimum operating temperature. The heat producing charges may be most useful during lift-off, when the system is cool.

In view of the thermal properties of such a system during normal straight flight, it may be expected that the chamber 24 will normally become very hot. Therefore, we prefer that this chamber be made of high temperature, high conductivity and high strength materials such as pyrolitic-graphite nickel and copper or combinations thereof. Furthermore, the material used for this chamber must be noncorrosive with respect to the fluids passing therethrough or must at least be coated with a noncorrosive layer. However, most details of the metallurgical and thermal considerations are known to the art of metallurgy and need not be thoroughly discussed in connection with the present invention.

Another consideration, during straight flight, because of the temperatures involved is the possibility of excessive heating of the chamber 24 despite the use of high temperature materials, particularly in such cases as the vehicle tends to stay on course without any thrust vector control. Therefore, we prefer to provide a thermocouple arrangement 40 sensitive to the temperature of the chamber 24 to initiate a minimum leakage flow through the valve 14 in the event a maximum critical temperature is reached. We prefer to locate the thermocouple arrangement 40 so that it accurately measures the maximum critical temperature, even during "minimum leakage flow" cooling. This minimum leakage flow will cause the heat of vaporization of the thrust vector control fluid to maintain the temperature of the chamber 24 below a maximum critical value. Because of the fact that the injectors 12, 12' and 12" are placed annularly around the propulsion nozzle 10, this leakage control system is most simply used if one over-heated leakage control signal prevents the closing of all of the valves 14, 14' and 14". By opening each valve a similar small amount, the over-all thrust is maintained balanced. However, in the more sophisticated system using reactive fluids to maintain a minimum critical temperature, the "cool" chamber is one which is vaporizing relatively large charges of thrust vector control liquid. Thus, the thermocouple arrangement 40 is coupled by way of the thrust vector control 20 to replace the normal thrust vector control liquid with reactive thrust vector control fluid in only the "cool" injector.

Because of the fact that fluid flow through a liquid valve (14) is more easily controllable it is, of course, preferred to assure that the valve 14 does not reach a high enough temperature so that the liquid vaporizes prior to or within the valve 14. A simple device for preventing this occurrence is illustrated in FIG. 2 wherein a thermal insulating coupling or tubing 42 is coupled between the spray nozzle 26 and the valves 14 and 16. By thermally isolating the valves from the chamber 24, the temperatures may be considered separately.

Referring again to the structure of the chamber 24, it should be noted that in most applications of the present invention we prefer to provide a plurality of inwardly projecting fins 46 to substantially increase the surface area against which the vector control liquid is projected by the spray nozzle 26. The thickness and heat storage capacity of these fins is dependent to a large extent on the heat transfer conditions of the design and the chemicals being used. Moreover, the structure of the injector 12 is arranged to prevent the possibility of liquid emission by the phenomena of leakage along the surfaces of the chamber 24. Thus, we prefer to provide inwardly projecting restrictions or flanges 48 which define the area of the aperture 22 and further, because of the location at the hottest portion of the injector 12, assure vaporization of any fluid which might tend to leak along the chamber walls 31.

In summary, we have described a reliable thrust vector control arrangement, which may be made as sophisticated as necessary to accomplish a particular flight program of a rocket vehicle. Our vector control arrangement takes advantages of the ease of handling a thrust vector control liquid and the greater effectiveness of using thrust vector control gas jets. Moreover, the parameters of our invention are selected so that a weight optimized constant pressure system is easily applied thereto.

We desire it understood, however, that this invention is not limited to the particular forms shown. For instance, although present technology indicates an extremely simple arrangement excluding the valve 16, the tank 17, the dome 27, the insulation 28, the passageways 30 and 32, and the bleeder vents 34 will be superior in both reliability and weight to the present state of the art, the more sophisticated system disclosed above is within the scope of our present thinking. We intend by the appended claims to cover all such modifications which do not depart from the true spirit and scope of our invention.

We claim:

1. A control for directing the flight path of a rocket propelled vehicle by modifying the main thrust jet of the rocket through the use of thrust vector control secondary injection comprising:

a nozzle through which exhausts the main thrust jet;
a source of liquid to be gasified and injected angularly into the main thrust jet to control its thrust vector;
a gasifying chamber including an interior wall surface receiving liquid from the source and having an outlet communicating with the main thrust jet in the nozzle, said chamber being jacketed and the space between the interior and exterior walls thereof being in communication with the main jet stream, the interior wall surface being heated by a portion of hot gas bled from the main jet, said gasifying chamber being exterior of the nozzle;
a spray nozzle receiving and distributing the liquid over the wall surface of the chamber; and
valve means controlling the flow of liquid from the source through the spray nozzle.

2. A control as defined in claim 1 and further including means sensing the temperature of the interior wall surface; and
means governed by the temperature sensing means to partially open the valve means to admit a minor quantity of liquid into the chamber to effect cooling of the interior walls of the chamber.

3. A control as defined in claim 1 wherein the rate of flow through the spray nozzle when the valve is full open, the rate of liquid vaporization by the chamber and the size of the chamber outlet are correlated to produce an outflow of gas at sonic velocity through the outlet.

References Cited by the Examiner
UNITED STATES PATENTS

| | | | |
|---|---|---|---|
| 2,635,422 | 4/1953 | Landgraf | 60—35.6 |
| 2,728,191 | 12/1955 | Casey | 60—35.6 |
| 2,916,873 | 12/1959 | Walker | 60—35.54 |
| 2,952,123 | 9/1960 | Rich | 60—35.54 |
| 2,974,594 | 3/1961 | Boehm | 60—35.54 X |
| 3,015,210 | 1/1962 | Williamson et al. | 60—35.54 |
| 3,020,709 | 2/1962 | Bertin et al. | 60—35.61 |
| 3,036,430 | 5/1962 | Eggers et al. | 60—35.54 |
| 3,116,603 | 1/1964 | Hausmann | 60—35.54 |

MARK NEWMAN, *Primary Examiner.*

SAMUEL LEVINE, *Examiner.*